Aug. 22, 1933.    G. GORTON    1,923,820
SLIDING BARREL ROTARY CUTTER SPINDLE CUTTER HEAD
Filed April 10, 1931    3 Sheets-Sheet 1
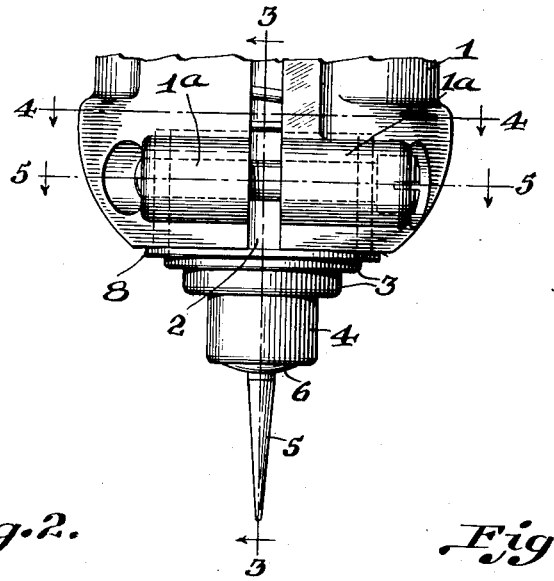
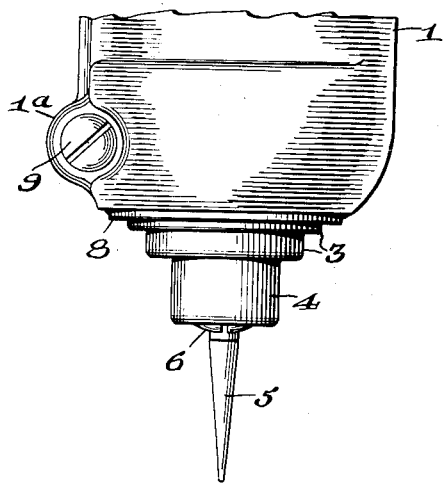
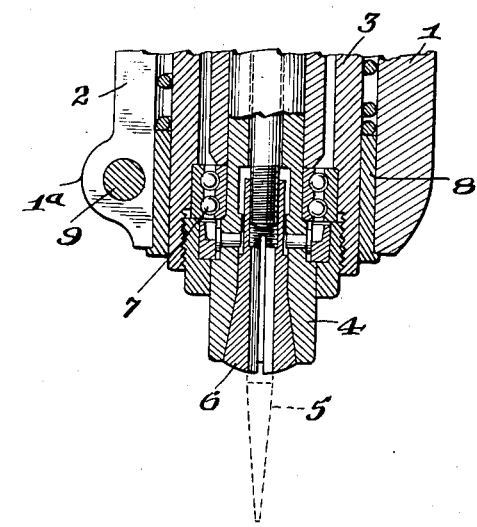
Inventor
George Gorton
By
Hubert E. Peck  Attorney Aug. 22, 1933.  G. GORTON  1,923,820
SLIDING BARREL ROTARY CUTTER SPINDLE CUTTER HEAD
Filed April 10, 1931   3 Sheets-Sheet 2

Inventor
George Gorton
By Hubert E. Peck   Attorney

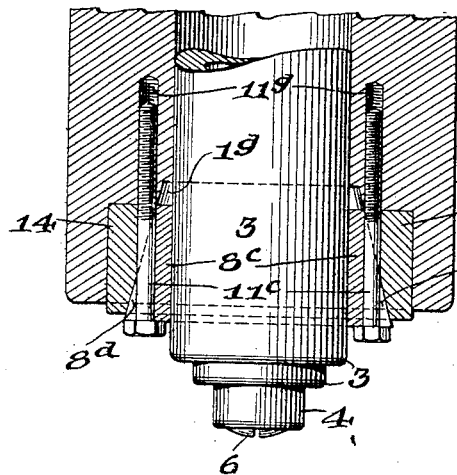
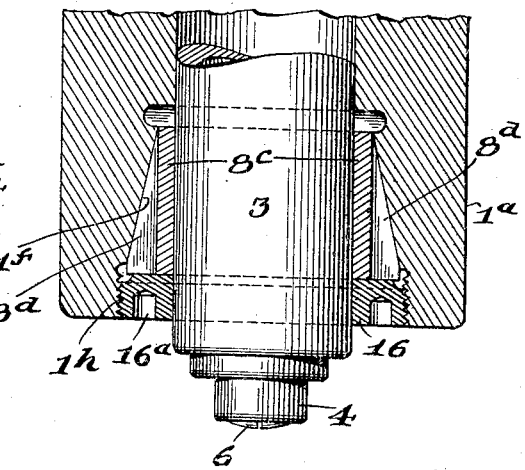
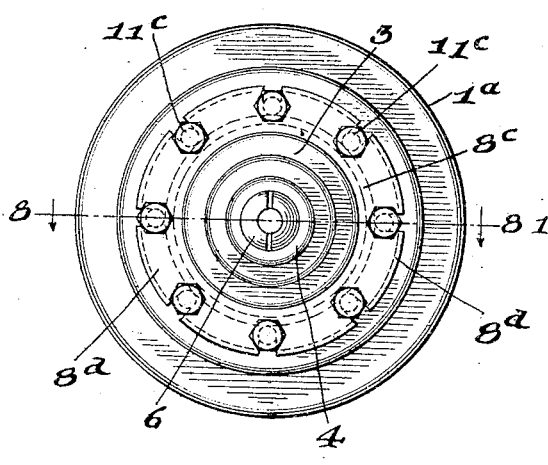
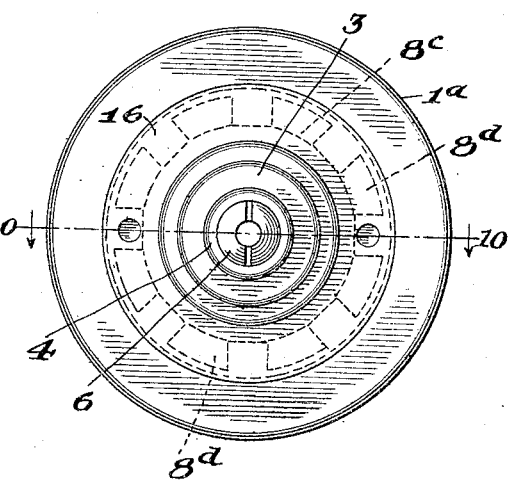

Patented Aug. 22, 1933

1,923,820

UNITED STATES PATENT OFFICE 1,923,820

SLIDING-BARREL ROTARY-CUTTER-SPINDLE CUTTER HEAD

George Gorton, Racine, Wis.

Application April 10, 1931. Serial No. 529,157

9 Claims. (Cl. 308—3)

This invention relates to a cutter head assembly for routing and other machine tools and the like wherein the rotary cutter spindle is mounted in and is carried to and from and held to the work by a sliding barrel; and the objects and nature of the invention will be understood by those skilled in the art in the light of the following explanations of the accompanying drawings that show what I now believe to be the preferred mechanical expressions or embodiments of my invention from among other constructions, arrangements and combinations within the spirit and scope thereof.

In tools that embody longitudinally slidable non-rotary barrels that carry the rotary cutter spindles mounted therein against substantial or objectionable relative or independent lateral and longitudinal movements with the spindles projecting or depending longitudinally from the barrels to hold and actuate the longitudinally projecting rotary cutters, serious loss of time and expense is involved in maintaining the bearing, particularly the lower end bearing of the barrel in the cutter head, against such looseness as causes objectionable lateral play or movement of the rotary cutter. The lateral pressures and stresses of the cutter at work, are transmitted to the slidable barrel usually causing increased lateral pressure of the barrel against its bearing surfaces, with resulting wear and increasing lateral looseness and poor and inefficient cutter work and lack of accuracy.

Barrels have usually been mounted at one or both ends in bearings each having an adjustable cap as per the construction of such bearings where the cap consists of one-half of the bearing, and when looseness developed such looseness was taken up so far as possible, by removing a portion of the material on the flat surfaces of the cap which fits against one-half of the bearing thus allowing the cap to close somewhat on the barrel. When adjustment is made in this manner the bearing surface is closed in one direction. It would of course be worn large in every direction but a bearing so closed would be still large laterally and even after adjusted would not leave a true cylindrical bearing clear around the bearing surface hence it would again become loose much sooner than if it had a perfect bearing entirely around. To adjust or close up a bearing of this nature requires more or less skill and considerable time and even when done by skillful men is never a perfect job for the reason given above and is therefore not altogether satisfactory.

An object of the invention is to provide simple, comparatively-inexpensive, easily and quickly operated, and durable means for overcoming the hereinbefore mentioned problem, with the ends in view of increasing the working efficiency and accuracy, and decreasing the cost of maintaining tools that embody rotary cutter spindles carried by slidable barrels.

A further object of the invention is to provide improved means whereby the bearing in a cutter head for the sliding barrel that carries the rotary cutter spindle of a machine or other tool, can be quickly adjusted from time to time, after the original installation and fitting, to take up subsequent lateral looseness of the barrel due to wear or other causes.

With the foregoing, and other objects in view my invention consists in certain novel features in structure, formation or combination, as more fully and particularly hereinafter explained and specified.

Referring to the accompanying drawings, forming part hereof:

Fig. 1 is a side elevation of a cutter head assembly embodying my invention, the cutter head being broken away.

Fig. 2 shows the cutter head of Fig. 1 in side elevation turned 90° from the position of Fig. 1.

Fig. 3 is a vertical longitudinal section on the line 3—3, Fig. 1.

Fig. 8 is a vertical longitudinal section on the line 8—8, Fig. 9, showing another species or modification of my invention.

Fig. 9 shows the structure of Fig. 8 in bottom plan or elevation.

Fig. 10 is a longitudinal section on the line 10—10, Fig. 11, showing my invention in still a different modified form or species.

Fig. 11 shows the construction of Fig. 10 in bottom plan or end elevation.

Figure 4:
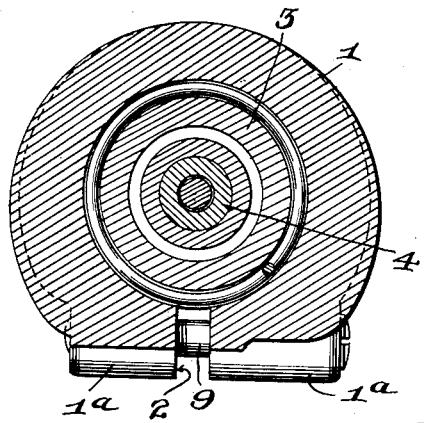
Fig. 4 is a cross section on the line 4—4, Fig. 1.

The cutter heads disclosed are more or less typical of those employed in various machine and other tools, and merely as an example, reference is made to the machine tool disclosed by my pending application filed August 21, 1929, Serial No. 387,330 (of which this application is in part a continuation) for complete disclosure of a machine tool example, from among others, its cutter head, its sliding barrel, means for counter-balancing the barrel and its load, means for feeding and controlling the barrel, a rotary cutter spindle mounted in and carried by the barrel and its drive and cutter chuck or collet, etc.

In Figs. 1—5, the cutter head housing 1, is, at least at its lower end portion, longitudinally split or slotted, see 2, to provide a contractile split clamp. In the constructions of Figs. 6—11, the cutter head housings 1a, shown are of the non-split or non-clamp forming type.

In all of the forms illustrated, I show non-rotary usually-cylindrical rotary cutter spindle carrying barrel or slide 3, mounted and longitudinally slidable in its cutter head housing and at its lower end depending therefrom. These barrels are of any suitable formation and construction, and any suitable means are provided for moving said barrels longitudinally in their respective cutter head housings and for holding them at the desired elevations, as appears, for example, in the disclosure of my said parent application.

In the various constructions illustrated, each slidable barrel 3, carries a rotary cutter spindle 4, of any suitable formation or construction, at its depending lower end equipped to receive, hold and drive a preferably renewable rotary cutter 5, in longitudinal downward continuation of the spindle. Usually, the downwardly projecting end of the rotary spindle 4, carries a suitable chuck or collet for removably clamping the cutter 5. For instance, I show a collet 6, which is provided with suitable actuating means, for instance, such as illustrated by my said parent application.

The rotary cutter spindle is, in the example shown, concentrically arranged within the barrel 3, and projects downwardly therefrom and is mounted therein, usually by thrust bearings 7, against objectional relative lateral and longitudinal movements. Any suitable driving means (not shown) is provided for the cutter spindle; an example of a suitable drive is illustrated by my said parent application.

In the operation of the cutter on the work, the cutter is subjected to lateral stresses and pressures, and this is particularly true of routing and milling operations, and these lateral pressures and stresses are in an exaggerated manner transmitted to the slidable barrel in which the cutter is mounted, and this is particularly true of the lower end portion of the barrel, and hence the lower bearing for the barrel in the lower end or lower portion of the cutter head housing receives these stresses and pressures and is thereby subjected to more or less excessive wear, yet to attain efficient and accurate cutter operation, this lower end barrel bearing must be constantly maintained tight and snug to prevent objectionable lateral looseness and play of the barrel which play and looseness will be exaggerated at the working point of the cutter. This lower end bearing must also have running sliding fit with the barrel to permit the desired more or less free sliding movement of the barrel in the cutter head housing, the requirements being that the barrel be mounted in the cutter head housing, for example approximately as disclosed by my said parent application, with a running sliding fit while held against rotation and maintained against such objectionable lateral play as will be transmitted to the rotary cutter, even though the instant case shows but the guiding bearing between the lower end portions of the barrel and cutter head housing.

My invention involves the provision of comparatively simple guiding bearing means to hold the lower portion of the barrel against objectionable lateral play while providing the desired running sliding fit between the same and the cutter head housing, of such peculiar characteristics as to be capable by a comparatively easy quick operation, in situ, of taking up wear and lateral looseness from time to time during the months and possibly years of tool operation, to maintain through a long period of operation without bearing renewal, the maximum accuracy of cutter operation by reduction of cutter lateral play or looseness to the minimum.

I employ a non-split or unbroken ring, annulus, sleeve or bushing of suitable hard material, such as hardened steel or alloy, to form the accurately fitted guiding bearing for, preferably, the lower end portion of the cutter spindle barrel, so that when the barrel, its complementary bearing bushing, and cutter head housing are originally assembled, the barrel will be tight against objectionable lateral looseness and will fit within the bushing with a running sliding fit to permit barrel reciprocation, and I also provide any suitable holding or clamping means for fixedly holding or clamping said bushing to and in operative position in and with respect to the cutter head housing, such means providing for bushing removal and renewal; and I successfully solved the hereinbefore identified machine tool problem, by providing a bearing bushing that is resilient or compressible and characterized by its capacity of progressively or repeatedly contracting in diameter step by step from its original diameter to the minimum diameter within its compressible capacity, under the periodical application of the necessary exteriorly applied bushing-compressing force or pressure; and by combining with the cutter head housing and such peculiar guiding bearing bushing, holding or clamping means characterized by its capacity of not only fixedly holding the unworn new bushing in the barrel-housing assembly, but also possessing the reserve capacity for periodically from time to time compressing said bushing in situ, as barrel looseness develops by wear to progressively and repeatedly contract the same in diameter step by step while maintaining its approximate cylindrical form, as required by wear, over a long period of machine operation, and to still fixedly hold the bushing after each contraction, in operative position in the assembly.

In the form of Figs. 1—5, the cylindrical barrel guiding bearing bushing 8, is snugly fitted within the lower end of the cutter head housing 1, and surrounds the cylindrical lower end of the slidable barrel 3, with a running sliding fit and fits such barrel when new with such snugness as to prevent objectionable lateral looseness or play. The split lower end of the housing is equipped with clamping screw 9, to provide a clamp that can expand to admit the bushing during assembly of the barrel and bushing, and then contract to merely clamp the bushing fixedly in operative position. This clamp also functions to permit bushing removal and renewal.

The bushing 8, in addition to its mere guiding and bearing function, also as hereinbefore set forth, is resilient or radially and annularly compressible and capable of contracting from its original diameter to permit progressive reduction in its diameter by repeated steps within its compressible limit.

The split clamp of the housing, is also construed and designed to provide the same with a reserve capacity for applying the necessary inward radial compressing force to, step by step, as required by wear, compress and contract said bushing to the reduced diameter and later to the still further reduced diameter necessary at each compression to take up the then existing looseness, and to thus hold the bushing after each compression.

The cooperating or contacting surfaces of the bushing the barrel are accurately dimensioned and finished and preferably hardened, if so desired can be "glass" hard. The bushing is relatively quite thin radially with respect to its diameter, and these bushings are usually several inches in over all diameter.

The clamp formed by the split portion of housing 1, and the connecting bolt or screw, is designed to radially compress cylindrical bushing 8, inwardly toward the longitudinal axis thereof while maintaining the cylindrical form of the bushing at each reduced diameter to which contracted, and while maintaining the cylindrical form of the interior of the clamp throughout its range of contraction, with the end in view of avoiding the reduction of the bushing to an elliptical form in cross section during contraction.

In the construction of Figs. 1—5, the split end of the housing 1, is peculiarly formed to prevent the walls at opposite sides of the slot 2, from being drawn inwardly beyond the inner circle of the housing, by the contracting screw.

Figure 5:
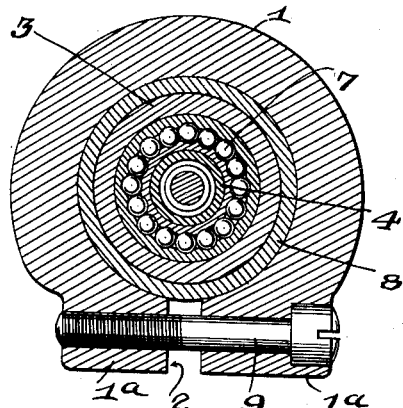
Fig. 5 is a cross section on the line 5—5, Fig. 1.

The cross sections Figs. 4 and 5, show that the split clamp is weakened diametrically opposite slot 2, and increased in thickness at each side of said slot, with elongated eyes or lugs 1a, to receive the powerful elongated clamping screw 9, and its complementary screw threads in one of said eyes, with the slot 2, of increased width when the clamp is fixedly holding a new and unworn bushing 8.

The purpose of the formation is to maintain the round or cylindrical form of the interior of the clamp throughout its contracting range to preserve at all times the cylindrical form of the inner surface of the bushing 8.

The bushing, in all forms shown, is composed of such hardened material and of such diameter and radial thickness as to have a reserve capacity for repeated compressions or contractions.

Usually, where my invention is employed with hardened barrels, and the hardened bushing is contracted in situ from time to time as barrel looseness develops, the bushing will last for a long time, say a year or longer, before the bushing has finally reached its minimum contracting capacity and bushing renewal becomes desirable.

Usually, when barrel looseness develops from wear, a bushing diameter contraction of say about one half of one thousandths of an inch is sufficient to tighten the barrel against objectionable shake or looseness, where the machine is closely watched and regularly inspected for and promptly tightened to take up barrel looseness. When objectionable looseness again develops, a further bushing diameter contraction of, say, about the same fraction of an inch, will usually produce the desired barrel tightness, and so on, until the total contraction from the original bushing diameter brings the bushing to its limit of contracting capacity. In the specific example just recited where the progressive repeated bushing contractions each reduce the bushing diameter about one half of one thousandths of an inch more or less, the total contracting capacity from the original diameter of the particular bushing of this example when new, will be about two one thousandths of an inch, more or less, although I do not wish to so limit my invention.

Figure 6:
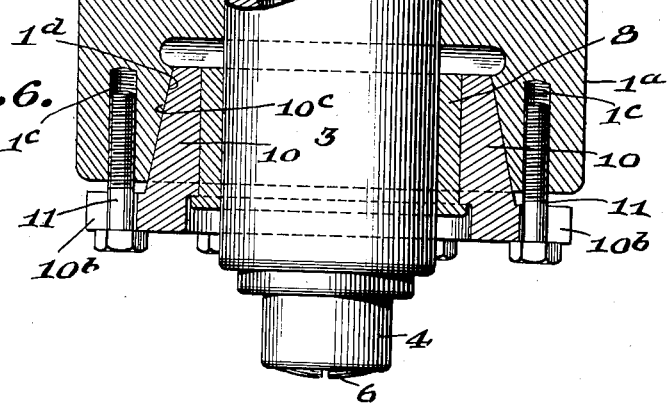
Fig. 6 is a vertical section on the line 6—6, Fig. 7, showing a different species or form of my invention.
Figure 7:
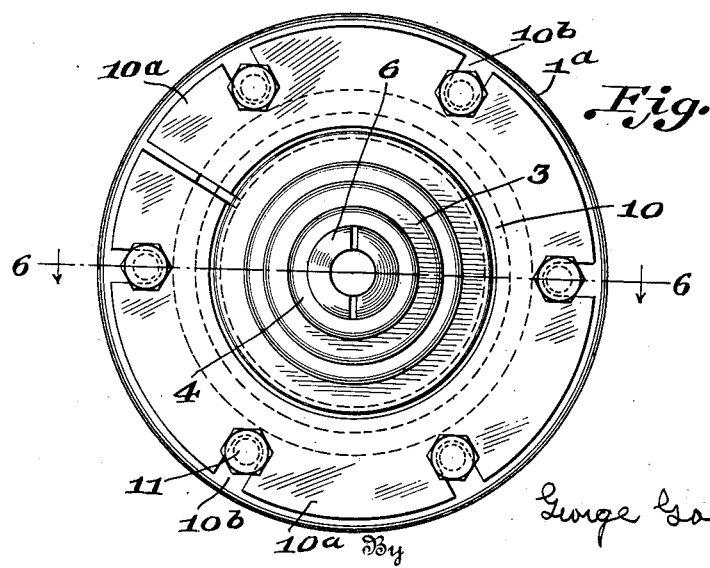
Fig. 7 shows the construction of Fig. 6 in bottom plan or end elevation.

In the form of my invention illustrated by Figs. 6 and 7, I show a non-split or unbroken cutter head housing in the bore of which the non-rotary barrel 3, is fitted and longitudinally reciprocatory. This barrel carries the rotary cutter spindle 4, as hereinbefore set forth. The lower end of the hardened barrel 3, is surrounded by and passes through the hardened compressible guiding bearing bushing, ring or annulus 8, with a running slidable fit and is thereby held against objectionable lateral play, as hereinbefore described, and the bushing 8, possesses the characteristics of the bushing 8, of Figs. 1—5.

In Figs. 6—7, the cylindrical bushing 8, is fixedly, yet removably, held in the lower end of the cutter head 1a, in operative relation to the barrel 3, by a longitudinally-split resilient contractile conical wedge or cone 10, having a central longitudinal cylindrical bore in which the bushing 8, is longitudinally, yet removably, arranged. The lower end of this bushing-holding and contracting conical wedge extends below the level of the lower end of head 1a, and is formed with an exterior annular outwardly projecting flange 10a, having a circular series of slots 10b, to receive headed vertical clamping and forcing bolts 11, depending from head 1a, through said slots with their wrench receiving heads abutting the under side of flange 10a. The head 1a, is formed with a circular series of longitudinally elongated vertical internally screw threaded sockets 1c, in which the bolts 11, respectively, are longitudinally adjustable by rotation, with the bolt screw threads meshing with the socket screw threads to anchor the bolts to head 1a, to raise the bolt heads and consequently the cone wedge 10, with respect to head 1a, by rotation of the bolts in the proper direction and to hold the cone wedge in the position to which elevated.

The cone wedge exteriorly reduces from the flange 10a, upwardly to its upper end by a gradual conical taper 10c, and the lower end of the bore of head 1a, is enlarged downwardly by a corresponding downwardly flaring longitudinal taper to provide upwardly contracting conical surface 1d, against which the downwardly enlarging exterior longitudinal conical surface 10c, fits and by which it is backed.

These conical slide surfaces 1d, 10c, are so formed and arranged that when the conical wedge 10, is forced upwardly within the head 1a, by successive rotation the screws 11, the conical wedge will be gradually contracted thereby gradually decreasing the diameter of its bore to annularly and radially compress and contract the bushing 8, tightly located in said bore and thereby reduce the bushing diameter while maintaining the cylindrical form thereof, to the extent necessary to produce the desired snug running sliding fit between the barrel 3, and the inner surface of the bushing.

The enlarged lower end of the bore of head 1a, is of sufficient length vertically and extends a sufficient distance upwardly beyond the level of the upper ends of bushing 8, and conical wedge 10, when these parts are in their original positions as first assembled with an unworn bushing held by said wedge snugly fitting the barrel and holding the same against objectionable lateral play or shaking, to permit the progressive repeated upward bushing contracting steps or movements, of the bushing and conical wedge together, to progressively contract the bushing on the barrel as necessitated by wear, to the full compressing capacity of the bushing, whereupon renewal thereof is desirable.

In the constructions illustrated by Figs. 8—11, I also show the non-split or unbroken cutter head housing 1a, having the lower end of its bore formed to provide a downwardly flaring or enlarging taper to provide upwardly contracting conical or wedge slide surfaces to cooperate with upwardly contracting conical or wedge slide surfaces carried by or moving with the contractile bushing, with screw threaded connecting or controlling means, all to cooperate to attain the results hereinbefore explained. In these last mentioned drawing figures, the contractile resilient compressible bushings 8c, possessing the characteristics of the bushings 8, hereinbefore described, are formed or otherwise provided as a fixed permanent part thereof with a circular series of longitudinal spaced exterior wedges 8d, the exterior circle of which constitutes the upwardly contracting conical wedge to cooperate on relative upward movement with the complementary upwardly contracting conical wedge surface of the head bore, in compressing and contracting the bushing around the barrel 3, while constantly maintaining the cylindrical form of the inner surface of said bushing.

In the construction of Figs. 8—9, the conical slide surface 1g, of the bore of head 1a, can be in part formed by an inserted hardened ring 14, although I do not wish to so limit my invention. The bushing is forced upwardly from time to time to cause progressive contractions of the bushing, as hereinbefore explained, and is held in each elevation to which thus forced, by vertical stud bolts 11c, having their wrench receiving heads below and upwardly abutting the bottom end face of the bushing, with the bolts located in the spaces between the radial exterior wedges 8d, and extending therefrom upwardly into the elongated vertical screw threaded sockets 11g, in the head 1a, and meshing with the screw threads thereof. The operation is obvious in the light of the foregoing. The bushings in this structure are also obviously removable and renewable, as well as in the structure of Figs. 10—11.

In the structure of Figs. 10—11, the spaced longitudinal radially projecting exterior wedges 8d, rigid with the contractile bushing 8c, at their upwardly converging outer faces directly engage and slide upwardly on the upwardly contracting conical surface 1f, of the bore of head 1a, when the bushing 8c, is forced upwardly by the ring nut 16, having spanner wrench sockets 16a, all to function in progressively contracting the bushing on the barrel 3, as hereinbefore set forth while maintaining the cylindrical form of the bushing. The lower end of the bore of head 1a, is cylindrical, relatively enlarged, and screw threaded, at 1h, below the removable bushing 8c, to receive and mesh with the removable ring nut 16, at its top face bearing upwardly against the lower end of the contractile bushing 8c, to progressively force the same upwardly for progressive contraction and to hold the same at the elevation to which forced.

It is evident that various changes, departures, additions, and modifications might be resorted to without departing from the spirit and scope of my invention substantially as defined by the following claims when construed in the light of the prior art to determine the scope to be accorded thereto, and hence the foregoing disclosure is presented as explanatory and not as limiting except where so required by the prior art.

What I claim is:—

1. In a machine tool cutter head assembly, a cutter-head-assembly supporting housing at its lower end forming a progressively contractile split ring clamp having a cylindrical bore maintained throughout its contraction; a barrel longitudinally arranged and slidable in said housing; a rotary cutter spindle mounted in and carried by said barrel; and a radially contractile non-split bearing and guide bushing having a capacity for repeated barrel tightening compressions while constantly maintaining cylindrical form, said bushing slidably surrounding the lower end of said barrel within and fixedly held by said clamp and adapted to be compressed by the clamp to contract the bushing to accurately engage the barrel with a sliding fit.

2. In a machine tool cutter head assembly; a non-rotary longitudinally slidable barrel provided with a rotary cutter spindle; a radially contractile bearing bushing supported independently of and snugly surrounding the outer end of said barrel and in which said barrel is slidable; and manually actuated screw means for forcibly applying exterior inwardly compressing pressure to said bushing to contract its bore around the barrel while maintaining the cylindrical form of said bore.

3. A cutter head assembly embodying a supporting housing; longitudinally split at one end and provided with contracting means to constitute a contractile ring clamp constantly maintaining the cylindrical form of its bore; a rotary cutter spindle barrel longitudinally arranged and slidable in said housing and clamp and provided with a rotary cutter spindle carried by the barrel toward and from the work; a radially contractile cylindrical bore guide and bearing bushing within said clamp and surrounding said barrel and adapted to be progressively and repeatedly contracted by said clamp to repeatedly reduce the cylindrical bore of the bushing to tighten said barrel from time to time as required by wear.

4. A machine tool cutter head assembly having a supporting housing, and including a sliding barrel having a cylindrical portion, a rotary cutter spindle carried by said barrel, a non-split guiding and bearing bushing for and surrounding the cylindrical portion of said barrel and supported independently thereof and having a cylindrical bore, said bushing being radially compressible to contract its bore around said barrel to maintain an accurate bearing and sliding fit between the barrel and bushing, and means exteriorly surrounding said bushing for normally fixedly holding the bushing and for exteriorly applying inward compressing pressure on the bushing to contract the same and progressively from time to time reduce its bore while maintaining the cylindrical form thereof, said means including manually actuated screw threaded pressure applying connections.

5. A machine tool cutter head assembly having a supporting housing, said assembly including a longitudinally slidable barrel; a rotary cutter spindle carried by the barrel and mounted therein against substantial lateral looseness; a non-split radially contractile bushing for and supported independently of said barrel, said bushing exteriorly surrounding the barrel and being radially contractile progressively and repeatedly under exteriorly applied inward compressing force to progressively and repeatedly from time to time reduce the bushing bore and maintain a snug running fit between the barrel and bushing as looseness develops by wear; and bushing holding means for progressively from time to time forcibly applying said inward compressing pressure to progressively and repeatedly reduce the diameter of the bushing bore while maintaining its original transverse form snugly surrounding said barrel against looseness.

6. A cutter head assembly that includes a rotary cutter spindle, a slidable barrel for and carrying said spindle, and means for maintaining said barrel against objectionable lateral shaking or play, said means embodying an unbroken normally-fixed compressible guiding bearing bushing having a cylindrical bore snugly receiving said barrel, said bushing characterized by its reserve capacity of substantially two one-thousandths of an inch for progressive repeated contracting to reduce its bore diameter from time to time as looseness develops by wear while maintaining its cylindrical form, and bushing holding and contracting means having the reserve capacity of repeatedly applying inward radial compressing pressure on said bushing to progressively reduce its bore diameter step by step and to thus hold the bushing after each contraction.

7. A cutter head assembly that includes a cutter head housing; a rotary cutter spindle; means for holding and moving the cutter to and from the work; a non-split radially compressible guiding bearing bushing for maintaining the spindle against excessive looseness; and means for fixedly holding and progressively compressing said bushing to contract the same step by step embodying an annular longitudinally flaring surface normally rigid with said housing, said bushing having means movable longitudinally therewith and slidably contacting said surface to cooperate therewith in holding and contracting the bushing on relative longitudinal movement between the bushing and surface; and screw threaded means for forcing the bushing longitudinally with respect to said surface.

8. In combination, a cutter head housing having a bore providing an annular longitudinal flaring taper; a sliding barrel arranged in said bore; a rotary cutter spindle carried by said barrel; a compressible guiding bearing bushing surrounding said barrel to hold the same and the spindle against excessive lateral play; a contractile cone wedge tightly surrounding said bushing and fitted in said flaring taper to be contracted thereby to compress and contract the bushing by relative longitudinal movement of the wedge and bushing within said taper; and screw means for forcing the cone wedge longitudinally of said taper.

9. In combination, a cutter head housing having within its bore a normally-fixed annular longitudinal flaring tapered surface; a barrel slidable longitudinally in the bore of said housing and carrying a rotary cutter spindle; a radially compressible guiding bearing bushing having a cylindrical bore snugly receiving said barrel and contractile to progressively reduce its bore diameter, said bushing having exterior slide surfaces engaging said tapered surface to cooperate therewith in progressively contracting said bushing as the bushing is forced longitudinally of said tapered surface; and a screw threaded connection between the bushing and cutter head for thus forcing the bushing longitudinally.

GEORGE GORTON.